E. F. Brundage.
Safety-Hook.
Nº 74043        Patented Feb. 4, 1868.
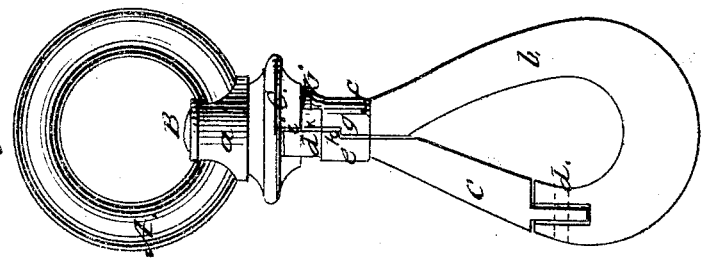
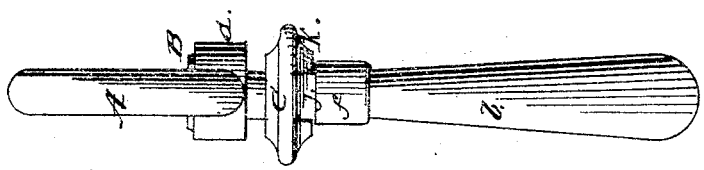
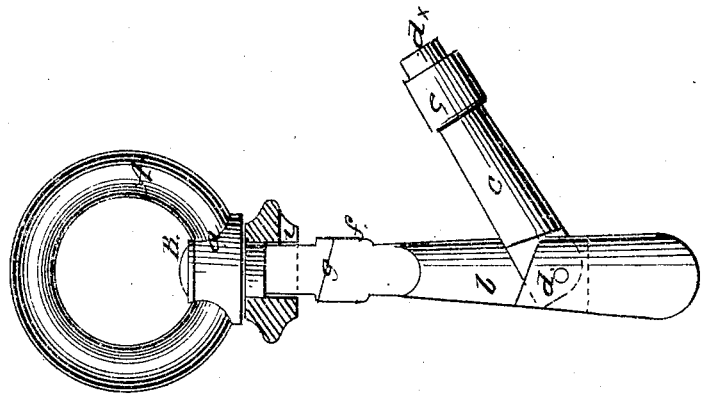
Attest:
Theo Tusche
J. A. Service
Inventor,
E. F. Brundage
Per Munn
Attorneys

United States Patent Office.

E. F. BRUNDAGE, OF VIRGINIA CITY, NEVADA, ASSIGNOR TO HIMSELF, WILLIAM T. EAVES, AND WILLIAM EAVES.

*Letters Patent No. 74,043, dated February 4, 1868.*

IMPROVEMENT IN SAFETY-HOOKS.

*The Schedule referred to in these Letters Patent and making part of the same.*

TO ALL WHOM IT MAY CONCERN:

Be it known that I, E. F. BRUNDAGE, of Virginia City, in the county of Storey, and State of Nevada, have invented a new and improved Safety-Hook; and I do hereby declare that the following is a full, clear, and exact description thereof, which will enable those skilled in the art to make and use the same, reference being had to the accompanying drawings, forming part of this specification, in which—

Figure 1 is an edge view of my invention in an open state.

Figure 2, an edge view of the same in a closed state.

Figure 3, a side view of the same in a closed state.

Similar letters of reference indicate corresponding parts.

This invention relates to a new and improved safety-hook, for watch and locket-chains, bridle-reins, trace-chains, &c.

The object of the invention is to obtain a simple and efficient hook of the kind specified, and one which will admit of the jointed portion of the hook being readily opened and closed, and also readily secured in a closed state.

A represents the eye of the hook, in which a stem, B, is fitted, and secured by a swivel connection or joint, $a$. This stem B extends down, is curved, and forms the greater portion, $b$, of the hook, the remaining portion $c$ being connected to $b$ by a joint, $d$, which admits of $c$ being turned out from $b$ laterally, or in a plane at right angles therewith, as will be understood by referring to fig. 1. On the upper end of the portion $c$ of the hook there is formed a half-round tenon, $d^\times$, and below it a half-round collar, $e$, rather greater in diameter than $d^\times$, as shown clearly in fig. 1, a corresponding collar, $f$, being on the upper part of the portion $b$ of the hook, and over which collar $f$ the collar $e$ of $c$ fits when $c$ is closed. On the inner surface of the collar $f$ there is an inclined shoulder, $g$, and a corresponding shoulder, $h$, on the collar $e$, the shoulder $h$ fitting over the shoulder $g$ when $c$ is closed, as shown in fig. 3. C is a milled collar, which is fitted loosely on the stem B, and allowed to slide freely up and down thereon to a certain extent. This collar is notched or recessed at its under side, as shown at $i$, to receive the tenon $d$ of the portion $c$ of the hook, when said portion $c$ is closed, and to admit of the collar being turned over or around the tenon $d$, to hold or clasp it in a closed state. On the upper end of the part $b$ of the hook there is a projection, $j$, and a hole or recess, $k$, is made in the under side of the collar C to receive the projection $j$ when the collar is pressed down on stem B. By this means the collar C is prevented from casually turning.

The device is extremely simple, and may be manufactured at a reasonable cost, and the part $c$ of the hook may be attached to the other part $b$, so as to turn out from $b$ in the same plane therewith. The invention is applicable to all purposes where a safety-hook is necessary or required.

I claim as new, and desire to secure by Letters Patent—

The collar C, fitted on the swivel-stem B, and provided with notches or recesses $i\ k$ in its under side, in combination with the hinged part $c$ of the hook, and the projection $j$ on the upper part $b$ thereof, all arranged substantially as and for the purpose set forth.

E. F. BRUNDAGE.

Witnesses:
WM. T. EAVES,
E. CHATELAIN.